United States Patent
Proctor et al.

(10) Patent No.: US 6,708,036 B2
(45) Date of Patent: Mar. 16, 2004

(54) METHODS AND SYSTEMS FOR ADJUSTING SECTORS ACROSS COVERAGE CELLS

(75) Inventors: Paul Proctor, Eatontown, NJ (US); Paul G. Zablocky, Shrewsbury, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 277 days.

(21) Appl. No.: 09/884,649

(22) Filed: Jun. 19, 2001

(65) Prior Publication Data

US 2003/0003918 A1 Jan. 2, 2003

(51) Int. Cl.[7] ............................................. H04Q 7/20
(52) U.S. Cl. .................. 455/446; 455/67.11; 455/424; 455/524
(58) Field of Search ......................... 455/446, 67.11, 455/423, 517, 424, 422, 524, 63.1, 63.2, 453; 370/241, 328

(56) References Cited

U.S. PATENT DOCUMENTS

| | | | | |
|---|---|---|---|---|
| 5,499,395 A | * | 3/1996 | Doi et al. ................... | 455/422 |
| 5,920,607 A | * | 7/1999 | Berg .......................... | 370/241 |
| 5,966,661 A | * | 10/1999 | Bernardin et al. ........... | 455/446 |
| 5,983,106 A | * | 11/1999 | Bernardin et al. ........... | 455/446 |
| 6,006,095 A | * | 12/1999 | Bernardin et al. ........... | 455/446 |
| 6,041,236 A | * | 3/2000 | Bernardin et al. ........... | 455/446 |
| 6,173,185 B1 | * | 1/2001 | Bernardin et al. ........... | 455/446 |
| 6,173,186 B1 | * | 1/2001 | Dalley ....................... | 455/446 |
| 6,285,664 B1 | * | 9/2001 | Bernstein et al. ............ | 370/320 |
| 6,456,652 B1 | * | 9/2002 | Kim et al. .................. | 455/446 |
| 2003/0003918 A1 | * | 1/2003 | Proctor et al. .............. | 455/446 |

FOREIGN PATENT DOCUMENTS

WO          00/54532     *   9/2000   ............ H04Q/7/36

OTHER PUBLICATIONS

Bernardin, et al., "Cell Radius Inaccuracy: A New Measure of Coverage Reliability," IEEE Transactions on Vehicular Technology, Nov. 1998, pp. 1215–1226.

* cited by examiner

Primary Examiner—Marsha D. Banks-Harold
Assistant Examiner—Rafael Perez-Gutierrez
(74) Attorney, Agent, or Firm—Joseph Giordano; James W. Falk

(57) ABSTRACT

Methods and systems are provided for adjusting sectors across coverage cells using base stations interconnected by a packet network. A plurality of wireless devices monitor the pilot channel signal strength of their respective serving cell. The serving cells then collect measurements from the wireless devices and calculate the boundaries of their respective coverage areas. The serving cells then transmit their calculations to their neighboringing cells. Upon receipt, the neighboring cells use the calculations to adjust the coverage of their sectors.

17 Claims, 8 Drawing Sheets

METHODS AND SYSTEMS FOR ADJUSTING SECTORS ACROSS COVERAGE CELLS

The application of Stephanie Demers, Paul Zablocky, and Shimon Moshavi entitled "Methods and Systems for Reducing Interference Across Coverage Cells", Ser. No. 09/884,637, filed Jun. 19, 2001, contains subject matter related to the present application and is hereby incorporated in its entirety by reference.

BACKGROUND OF THE INVENTION

1. Field of Invention

The present invention relates to sectorized wireless communication systems, and more particularly, to methods and systems for providing adjustable sector configurations across wireless cells.

2. Description of the Prior Art

As wireless communications become more widely used, the demand for limited wireless resources, such as the finite number of frequency bands, time divisions, and/or identifying codes (collectively referred to herein as "channels") have increased significantly. It should be appreciated that channels may be distinguishable based on the particular air interface standard implemented such as the frequency bands of frequency division multiple access (FDMA), time slots of time division multiple access (TDMA and W-TDMA), pseudo random codes of code division multiple access (CDMA and W-CDMA), and the like. In order to more efficiently use these available resources, wireless communication systems typically divide a geographic area into multiple overlapping coverage cells, which are each served by a base station. Each base station typically comprises a tower, one or more antennas, and radio equipment to allow wireless communication devices to connect with the network side of a wireless communications link.

Conventional wireless communication systems utilize a variety of schemes for providing comprehensive coverage of an area while providing sufficient communication capacity without an undesirable level of interference. For example, one scheme includes using particular antenna radiation patterns such as sectorization. Using narrow-beam antennas, a coverage cell may be divided into smaller areas, called sectors, each having a specific radial coverage area within the cell. The antenna(s) defining a particular sector provide wireless communication capacity to wireless devices within the sectors' specific radial coverage area. In addition, sectors are typically configured to overlap with adjacent sectors to provide seamless communications to wireless devices moving between sectors.

In a conventional wireless communication system, a cell is typically broken into three to six equal sectors. However, the coverage area or shape of the sectors typically depends upon the geographic area the sector comprises. In other words, even with the same antenna array and transmitting power configuration, the shape of each sector typically differs based on such factors as climatic changes, differences in terrain, development, etc. For example, a sector in which there are a large number of tall buildings will typically have a different coverage area shape than a sector in which there is mostly dense foliage.

Further, the shape of a sector can vary dynamically with environmental changes leading to areas where coverage is absent. These areas, called "dead spots," are often caused by physical barriers such as hills, tunnels, and the like. In addition, the varying shape of a sector can reduce or eliminate the overlap between adjacent sectors and adjacent cells leading to dropped communications. Thus, it would be advantageous to more efficiently use wireless capacity by dynamically adjusting the shape of sectors in order to avoid dead spots and dropped communications.

In addition, adding or moving base stations in a conventional wireless communication system requires considerable planning to determine the precise locations of each base station to ensure that the entire coverage area of the system is covered without dead spots or redundancy. Such planning typically includes the physical mapping of the coverage area. For example, one conventional method of mapping a coverage cell comprises placing a transceiver on a mobile unit such as an automobile and measuring the reception as the unit moves throughout the area. Because cell mapping can be costly and time consuming, it would be advantageous for base stations to dynamically map cells based on communications received from wireless devices.

SUMMARY OF THE INVENTION

Accordingly, methods and systems are provided to address the above and other problems of the prior art.

Methods and systems consistent with the invention, as embodied and broadly described herein, comprise a method for adjusting coverage in a wireless communication system. In one embodiment of the present invention, measurements performed by at least one wireless device at a first cell having a first coverage area is received at the first cell. Upon receiving the measurement information, the first coverage area is determined based on the received measurement information. The first cell then transmits information about the first coverage area to a second cell having a second coverage area. Upon receipt, the second cell may then use the received first coverage area information to adjust the second coverage area.

In another embodiment, such methods and systems comprise a method for mapping coverage in a wireless communication system. In accordance with the invention, a plurality of wireless devices is provided at a first cell having a first coverage area. The power of the first cell is monitored by the plurality of wireless devices and collected by the first cell. Based on the collected power information, the first coverage area is mapped.

It is to be understood that both the foregoing general description and the following detailed description are exemplary and explanatory only and are not restrictive of the invention, as claimed. Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims. The accompanying drawings, which are incorporated in and constitute a part of this specification, illustrate several embodiments of the invention and together with the description serve to explain the principles of the invention.

DETAILED DESCRIPTION OF EMBODIMENTS OF THE INVENTION

Reference will now be made in detail to the preferred embodiments of the invention, examples of which are illustrated in the accompanying drawings. Wherever possible, the same reference numbers will be used throughout the drawings to refer to the same or like parts.

Figure 1:
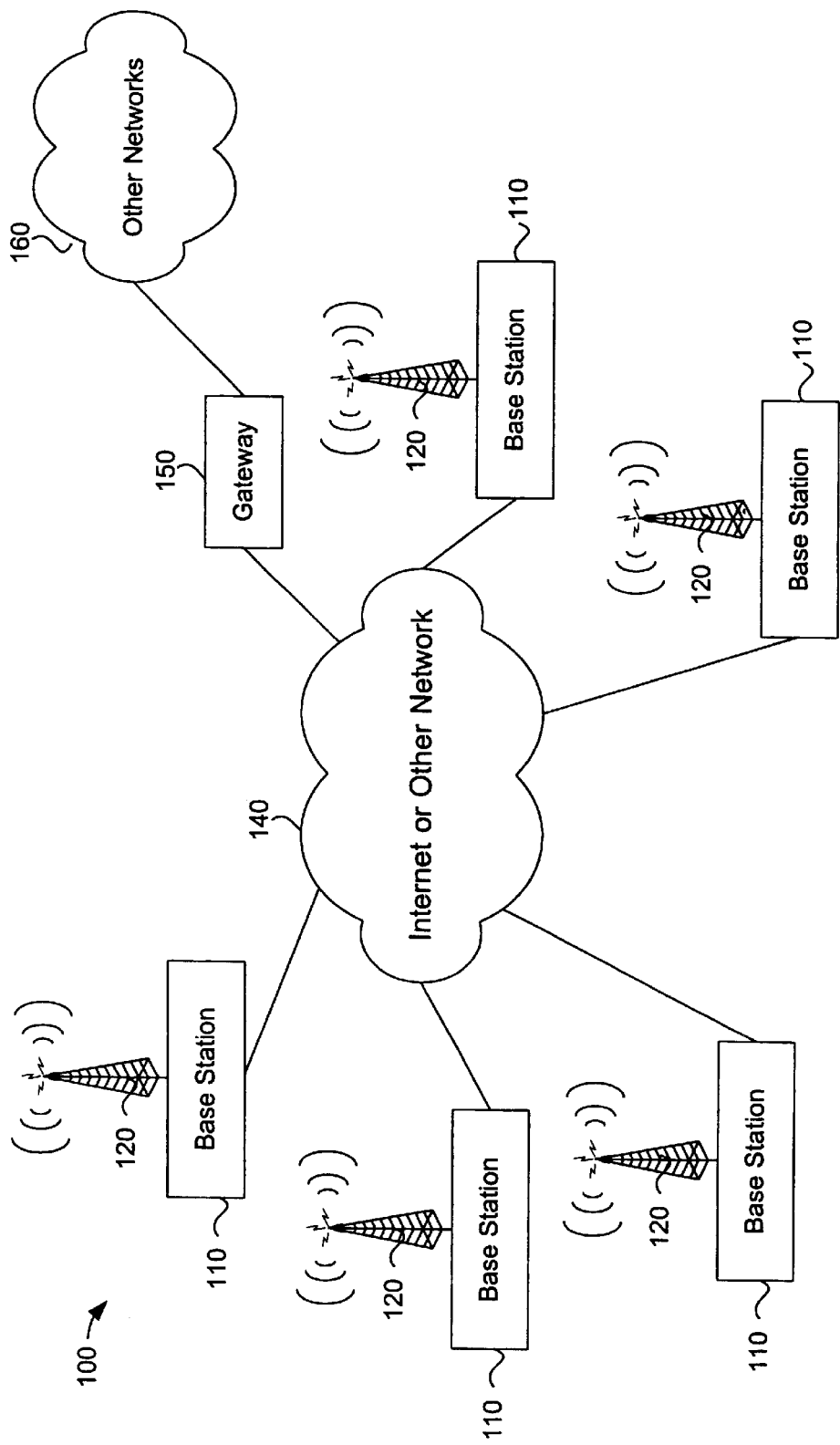
FIG. 1 illustrates a wireless system, in accordance with methods and systems consistent with the invention.

FIG. 1 illustrates a block diagram of a wireless system 100, in accordance with methods and systems consistent with the invention. As illustrated, one or more base stations 110 are connected to a network 140, which may include, for example, the Internet or any other type of network, The base stations 110 may be directly connected to network 140 or may be connected to network 140 through subnetworks (not shown). Other networks 160 may be connected to network 140 through a gateway 150.

As illustrated, each base station 110 is connected to an antenna 120 through which communication is established with wireless devices. Like present cellular systems, each base station 110 communicates with wireless devices located in a particular cell where each cell covers a specific geographical area. The wireless devices (not shown) used to communicate in cellular wireless system 100 may include, for example, a standard wireless phone, a third generation cellular device, or any other type of wireless device.

In cellular wireless system 100, the intelligence that in the prior system resided in the base transceiver systems ("BTS"), base station controllers ("BSC"), and mobile switching centers ("MSC") may be distributed amongst the base stations 110.

For example, each base station 110 may operate autonomously and include intelligence for exchanging information with other base stations for the purposes of adjusting the coverage areas for the base stations, handing off wireless devices from one base station to another, and, when the base station 110 is plugged into the network 140, automatically locating other base stations and configuring itself. Further, each base station 110 may be configured using software programmable on a MultiPC platform. That is, the base stations 110 may not need specific hardware, but rather, all of the base station's functionality may be performed in software using general purpose processors.

Because there is no central MSC or BSC, the wireless system can be grown simply by adding base stations 110 to the wireless system. As such, this solution may be used for both very small and very large configurations. Also, the base stations 110 may use advanced signal processing, such as space time adaptive processing ("STAP"), multi-user detection ("MUD"), and multi-user detection across cells ("MUDAC"). Further, the base stations 110 may use sectored antennas that adapt their direction dynamically to improve network performance.

The base stations 110 may also use standard internet protocols for communicating over the network 140. For example, the base stations may use Mobile IP, DHCP, VPN, etc. to communicate with each other. Also, the base stations may use standard air interfaces, such as, IS-95, cdma2000, UWC-136, W-CDMA, UMTS-3GPP-W-CDMA, etc. Further, because standard air interfaces may be used, no changes to existing cellular phones or networks are necessary.

Figure 2:
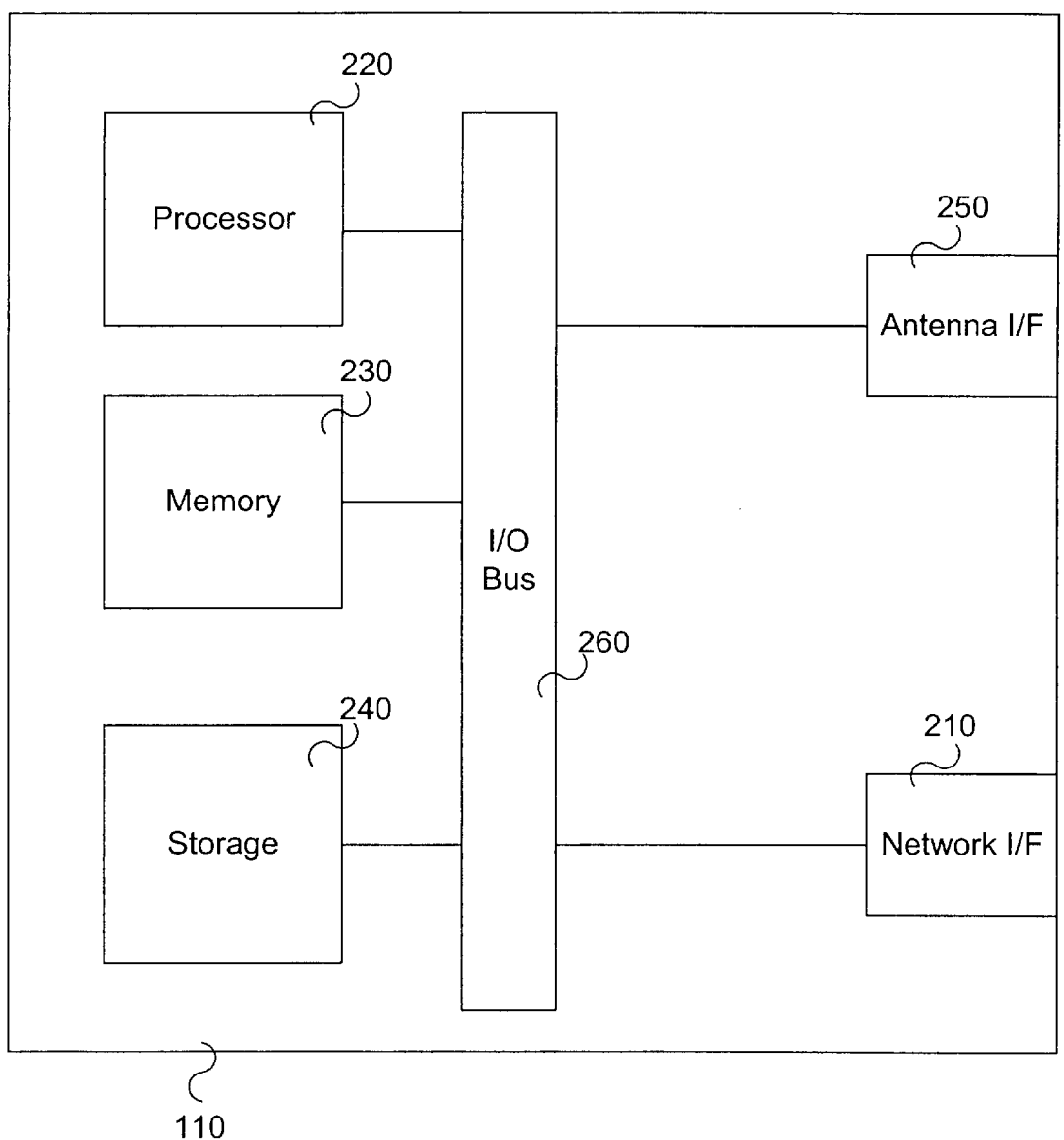
FIG. 2 illustrates a block diagram of a base station, in accordance with methods and systems consistent with the invention.

FIG. 2 illustrates a block diagram of a base station 110, in accordance with methods and systems consistent with the invention. As shown, the base station 110 includes a network interface 210, a processor 220, a memory 230, a storage device 240, an antenna interface 250, and a bus 260. The network interface 210 may be, for example, an Ethernet type interface that the base station 110 may use to connect to the network 140. The processor 220 may be any type of processor for performing computer type operations. The memory 230 may be any type of memory, such as a Random Access Memory (RAM). The storage device 240 may be any type of storage device, such as, a hard drive, a CD-ROM, etc. The antenna interface 250 connects the base station to an antenna for communicating with wireless devices. The antenna interface 250 may include a radio transmitting and receiving device (not shown).

As discussed above, each base station may be a plug and play type device. For example, when a base station 110 connects to a network such as network 140, it automatically identifies any other base stations 110 also connected to the network. Then, the base stations 110 communicate with one another to automatically determine the coverage area for the new base station and the existing base stations in the network. Then, the base stations may communicate amongst themselves to accomplish various functions, such as handing off wireless devices from one base station to another.

Figure 3:
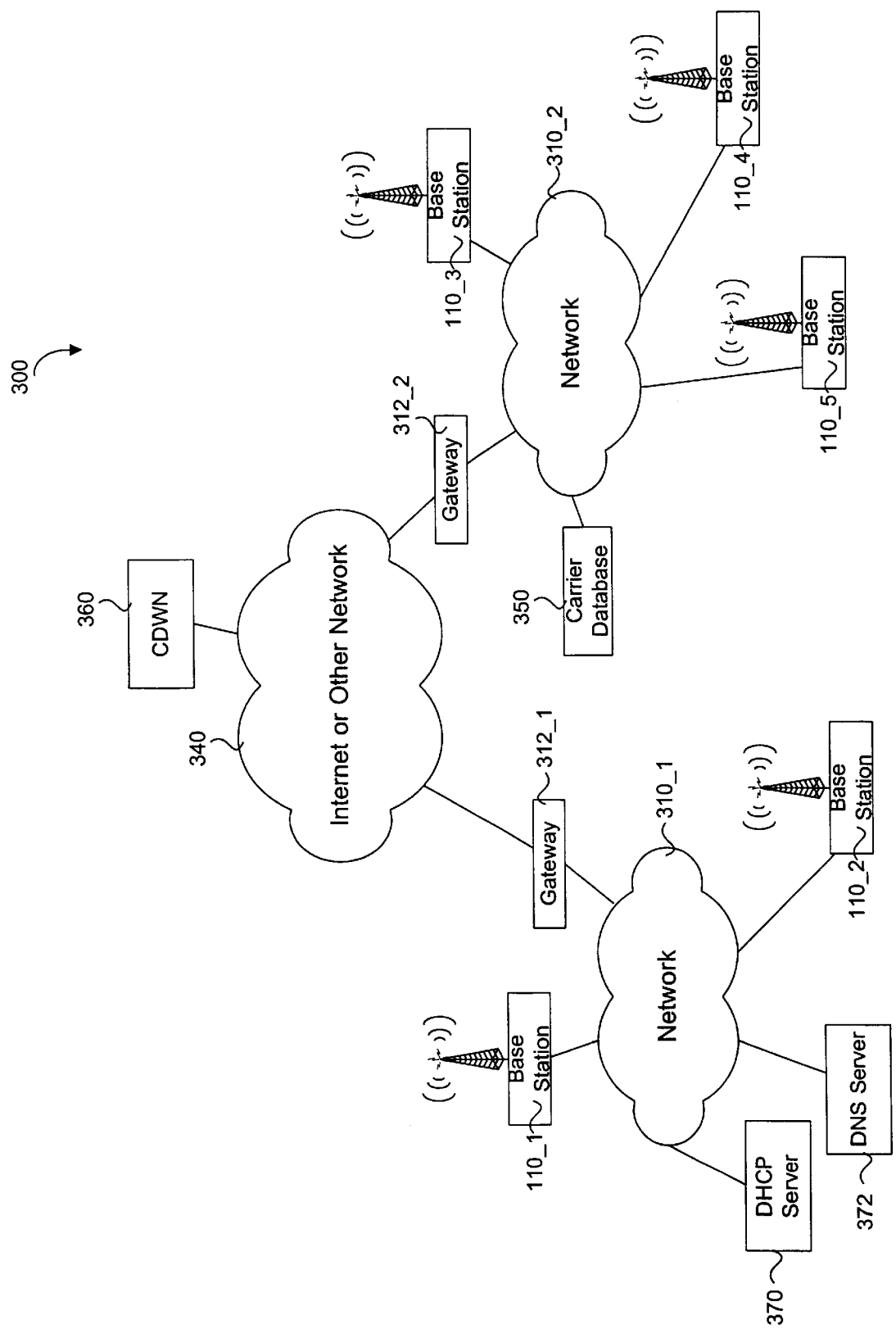
FIG. 3 illustrates a wireless system, in accordance with methods and systems consistent with the invention.

FIG. 3 illustrates a wireless system 300, in accordance with methods and systems consistent with the invention. As illustrated, base stations 110_1 and 110_2 are connected to network 310_1, which is connected to a network 340 through gateway 312_1. Network 310_1 may include a Dynamic Host Control Protocol ("DHCP") server 370 and a Domain Name Server ("DNS") 372.

Base stations 110_3, 110_4, and 110_5 are connected to a network 310_2, which connects to network 340 through gateway 312_2. A carrier database 350, which connects to network 310_2, stores information regarding the base stations in a carrier's network. For example, the carrier database 350 may store the IP address for each of the base stations in the carrier's network. A carrier refers to a company providing wireless services.

Networks 310_1 and 310_2 may include any type of network, such as, an Ethernet, a Fiber Distributed Date Interface ("FDDI") network, etc. Network 340 may also include any type of network, such as the Internet.

The central database of wireless networks ("CDWN") 360 stores information regarding the network addresses (e.g., IP addresses) for the carrier database 350. For example, there may be multiple carriers providing wireless services, such as Bell Atlantic, Sprint, etc. In such an embodiment, the CDWN 360 may store the network address of the carrier database 350 for each carrier. Thus, if a base station needs to locate a carrier database 350 of a particular carrier, it can access the CDWN 360 to obtain the network address for the carrier database 350.

With the above preface on the illustrative operating environment, the remaining FIGS. 4–8, which illustrate aspects of the preferred embodiments of the present invention, will be described.

Figure 4:
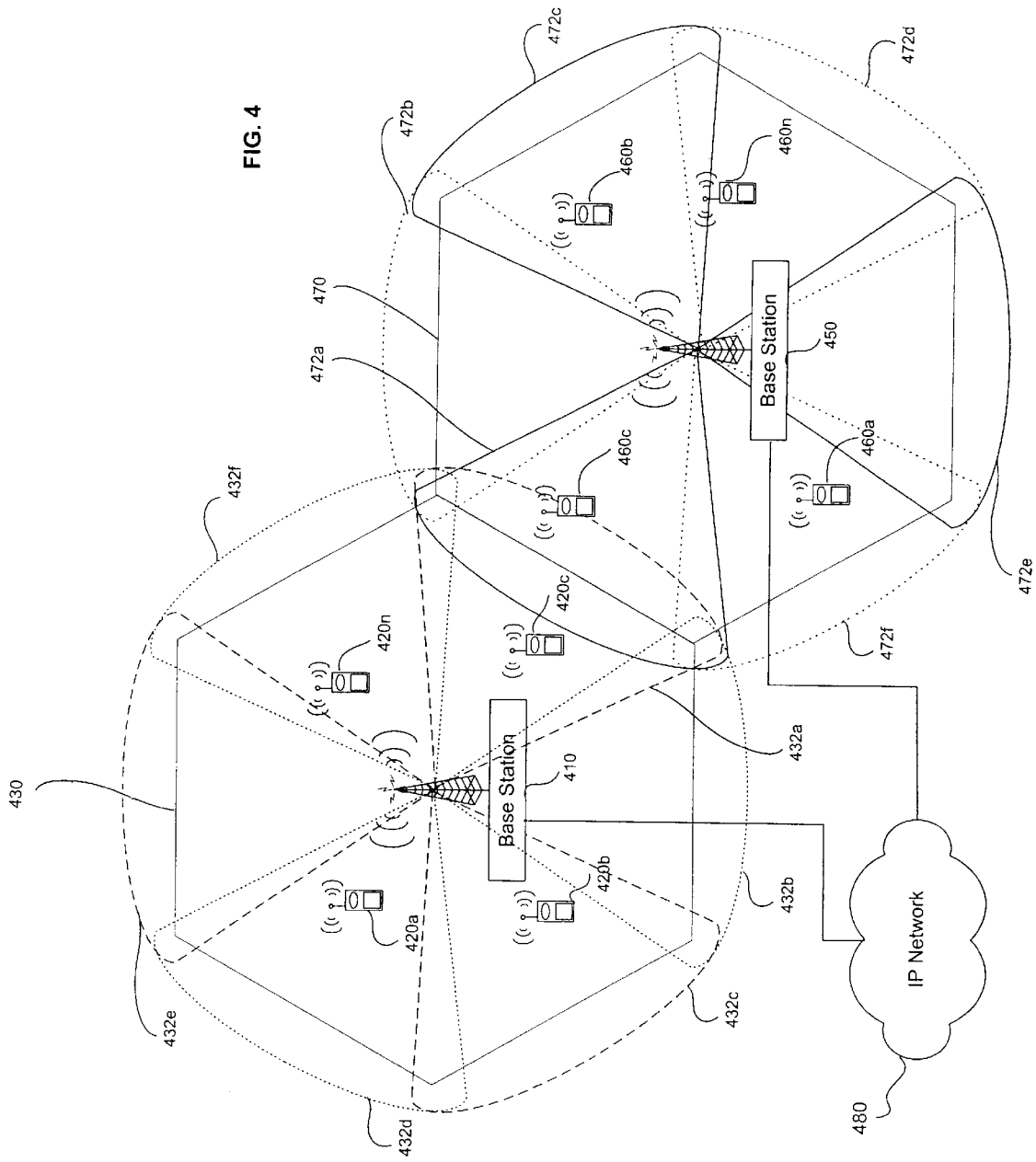
FIG. 4 illustrates two exemplary base stations in a wireless communications system operating in accordance with methods and systems consistent with the present invention.

FIG. 4 illustrates two exemplary base stations 410 and 450 connected by a network 480 in a wireless communications system operating in accordance with methods and systems consistent with the present invention. While the two exemplary base stations 410 and 450 are shown to be interconnected via packet network 480, any network with sufficiently high data speed and sufficiently low delay could be used to connect the base stations. As described above, in one embodiment of the present invention, the packet network 480 may include the global computer network commonly referred to as the "Internet." The packet network 480 may use protocols well known to those skilled in the art, such as Mobile IP.

Wireless devices typically have a limited range and communicate within respective coverage cells of a wireless communication system. Within such a system, a handoff occurs when a wireless device moves out of range of its existing base station contact within a given cell. Instead of allowing the call connection signal to deteriorate to noise level, the call connection is transferred or handed-over to another cell to maintain the communication with the roving wireless device.

Base stations 410 and 450 are also shown serving a plurality of wireless devices, 420a, 420b, 420c, . . . , 420n and 460a, 460b, 460c, . . . , 460n, respectively. A handoff occurs when a wireless device moves out of range of its existing base station contact within a given cell. The wireless device is transferred or handed-over to another base station to maintain communications with the roving wireless device. In the well-known "soft handoff" method, a wireless device simultaneously communicates with two or more base stations as the wireless device moves between the coverage areas of the respective base stations. Soft handoff can be contrasted with "hard handoff," where communications with the first base station are terminated before a link with the second base station is established. Maintaining at least one link at all times improves the reliability and quality of communications being conducted.

The coverage areas of base stations 410 and 450 are shown as hexagonal cells 430 and 470, which serve to indicate an approximate boundary within which radio communications can be effected with their respective wireless devices 420 and 460. Data is communicated between wireless devices operating within its radio coverage area and their respective base stations by transmitting and receiving radio signals.

Each base station 410 and 450 may include an antenna array comprising at least one antenna that is capable of simultaneously communicating with a plurality of wireless devices. Because each wireless device is individually located within a cell, a plurality of transmission paths exists between the antennas and the wireless devices. Each transmission path, in turn, has a corresponding path delay and signal strength relative to its receiving antenna.

Using their antenna arrays, base stations 410 and 450 may subdivide cells 430 and 470 into multiple sectors. For example, cells 430 and 470 are each divided into six sectors 432a through 432f and 472a through 472f, respectively. In the case of a typical six-sectored system, channel use is generally limited to a 60 degree radius about the cell site. It should be appreciated, however, that individual sectors 432 and 472 may be adjusted to have greater or lesser coverage areas about the cell site of disproportionate angles.

Figure 6:
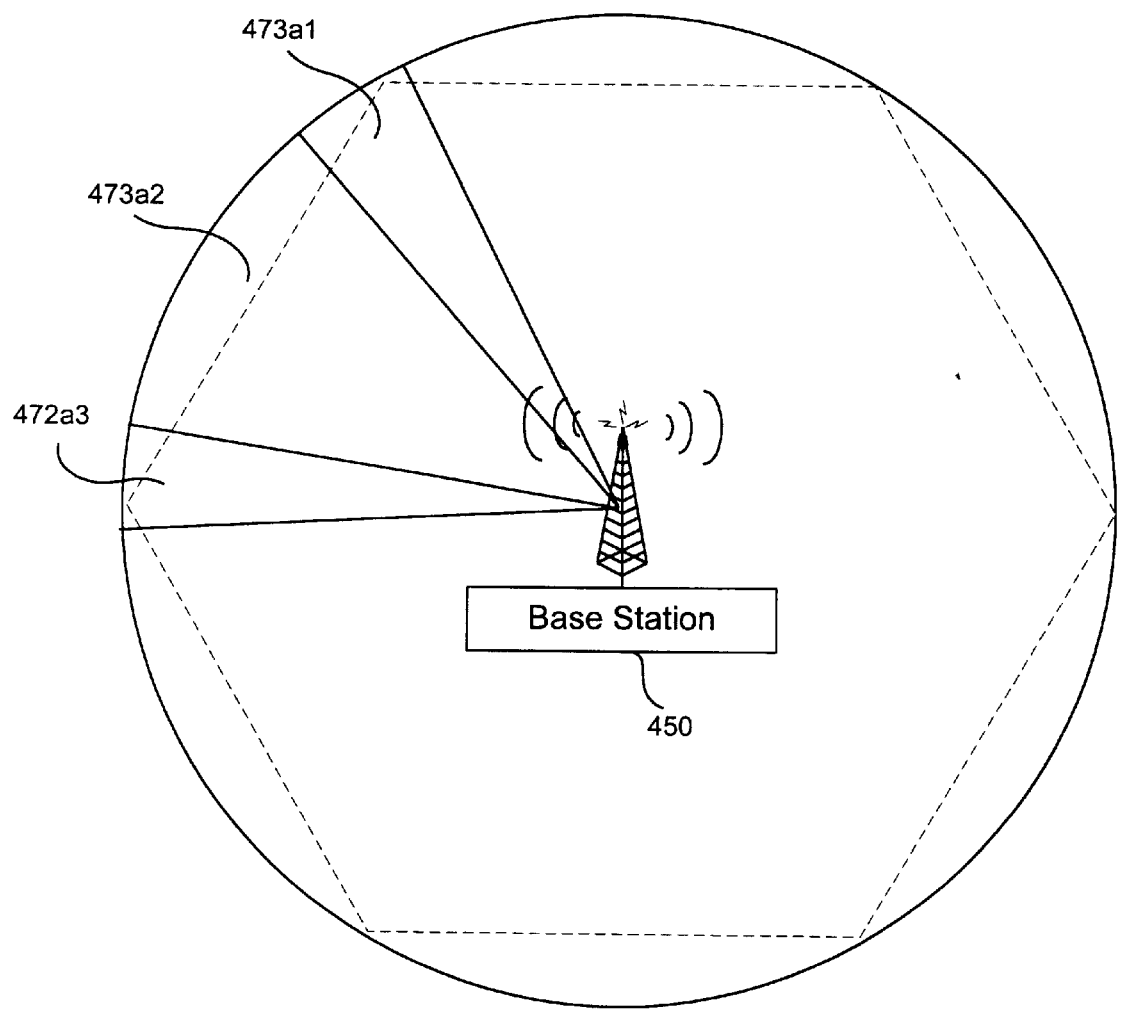
FIG. 6 illustrates a sector subdivided into sub-sectors in accordance with methods and systems consistent with the present invention.

Still referring to FIG. 4, sectors 432 and 472 are shown to overlap with adjacent sectors at sector overlaps 432a3 and 473a1 (FIG. 6). The overlapping sectors may provide soft handoff capability, thus allowing a wireless device with the overlapping area to simultaneously communicate with two or more base stations. As shown in FIG. 4, sector overlap may occur across cells or within a cell.

In this embodiment, the wireless devices communicate with their respective base stations via their antennas in accordance with Wide-Band Code Division Multiple Access ("W-CDMA"). A detailed explanation of how data is communicated using W-CDMA is provided in the 3GPP standards:

Physical Layer: 3GPP TS 25-200 Series (Release 1999)
UE-UTRAN radio interface: 3GPP TS 25-300 Series (Release 1999)
UTRAN Iu, Iur, Iub interfaces: 3GPP TS 25-400 series (Release 1999)

the contents of which are incorporated herein by reference in their entireties. While several embodiments of the present invention will be generally described in the context of a W-CDMA wireless communication system, the present invention is not limited to use in any particular communication scheme and may be utilized for any communication scheme or standard.

Figure 5:
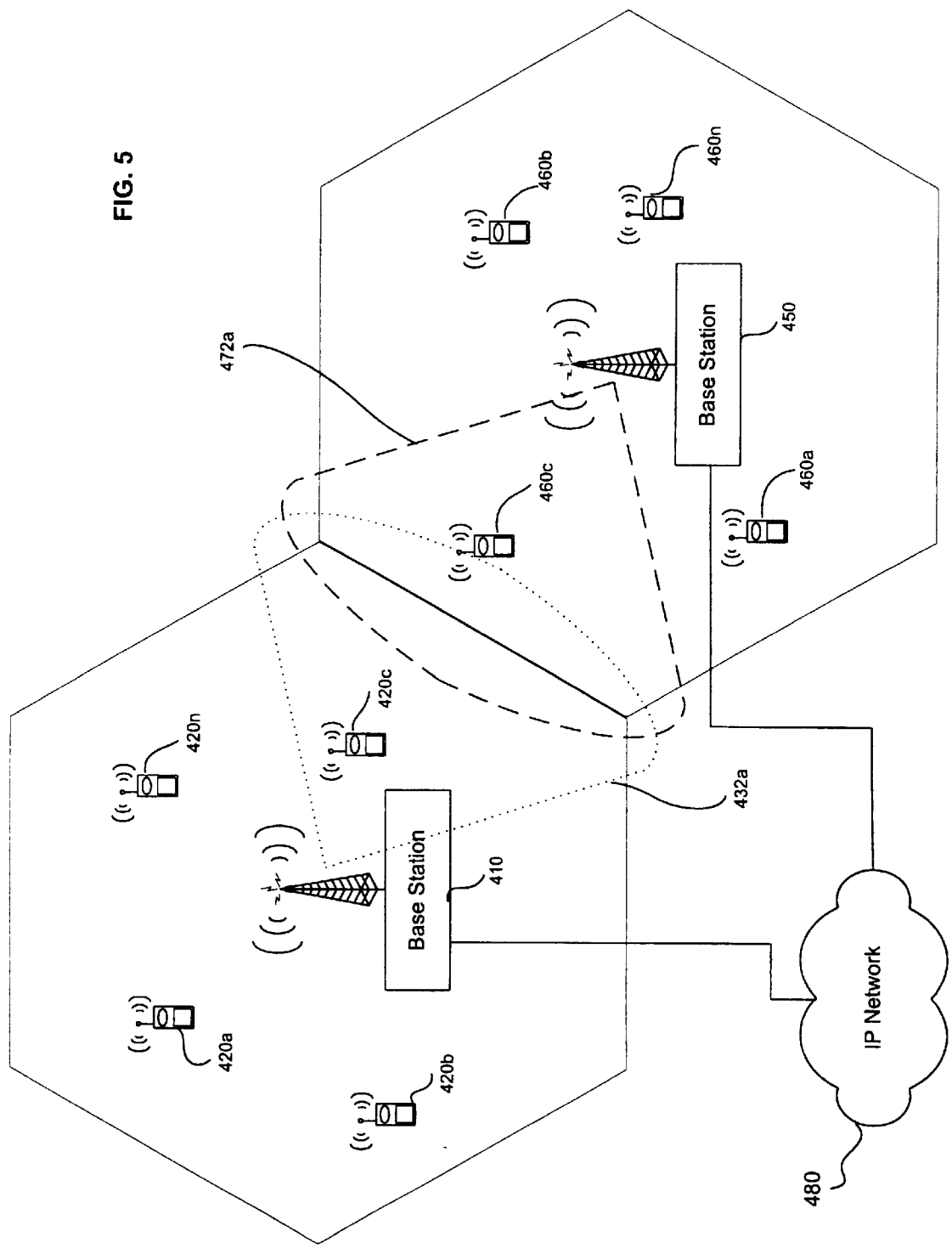
FIG. 5 illustrates a simplified version of two exemplary base stations dynamically adjusting sector shapes across coverage cells in accordance with methods and systems consistent with the present invention.

Referring now to FIG. 5, a simplified version of a wireless system having two exemplary base stations dynamically adjusting sector shapes will be described in accordance with methods and systems of the present invention. For simplicity, only sectors 432a and 472a are shown. However, the system described applies to all sectors within cells 430 and 470 as well as sectors from adjoining cells (not shown).

In an embodiment, wireless devices 460 and 420 perform downlink channel measurements on their serving base stations. For example, wireless device 460a may perform signal strength measurements on the serving sector's pilot channel. In another embodiment of the invention, wireless device 460a may perform signal strength-to-noise ratio measurements on the serving sector's pilot channel. Methods and systems for measuring signal strength are well known to those skilled in the art of wireless technology. Likewise, methods for measuring a signal-to-noise ratio are well known to those skilled in the art of wireless technology.

These measurements are communicated to the respective serving base station by data messages sent from the wireless devices. In an embodiment of the invention, wireless devices may transmit measurement messages at periodic time intervals or when requested by their serving base station. In another embodiment, the serving base station may specify transmission of measurement information based on particular measurement reporting criteria. For example, measurement reporting criteria may specify periodic reporting, event triggered reporting such as when a communication is initiated, or a combination of both periodic and event triggered reporting.

The format of the data messages may be defined by, for example, the W-CDMA standard. In the W-CDMA standard, communications between a base station and a wireless device are via a plurality of simultaneous, orthogonally-coded channels.

In accordance with one embodiment of the invention, on receipt of multiple measurements from the wireless devices, the respective base stations 410 and 450 evaluate the information to determine boundary estimates, or approximations of the effective coverage area, of each sector 432 and 472, particularly sectors 432a and 472a. A method for determining boundary estimates will be further described below with reference to FIG. 6.

Upon determining a boundary estimate for sectors 432a and 472a, base stations 410 and 450 transmit their respective estimate to each other via network 480 (as well as other base stations having sectors overlapping sectors 432a and 472a (not shown)). On receipt of the respective boundary estimate, base stations 410 and 450 may then apply the estimate to determine whether any adjustments should be made to the shapes of sectors 432a and 472a. In other words, base station 410 may apply its estimate of 432a to the estimate of 472a provided by base station 450 to determine whether any adjustments are necessary. In an embodiment of the invention, determining whether adjustments are necessary includes evaluating whether the soft-handoff areas, i.e., the overlapping areas between the sectors, meet a predetermined area based on the initial layout of the network. If so, the base stations then both adjust the shapes of their sectors to better approximate the desired soft-handoff area. In this embodiment, the shape of the sector may be adjusted by modifying the strength of the pilot channel.

Referring now to FIG. 6, a method for adjusting a sector will be described in accordance with methods and systems consistent with the present invention. In an embodiment, the initial layout of a wireless communication system, including the number and size of each cell and sector; the location, e.g., latitude and longitude, of each base station; as well as the desired sector overlap areas are determined. For example, this information may be determined during the planning stages of a wireless communication system based on required constraints such as cost and desired soft-handoff overlap area. Alternatively, this information may be determined using methods and systems in accordance with the illustrative operating environment. In addition, the respective pilot channel power strengths of each base station may be known.

Using methods known to those skilled in the art, the locations of wireless devices may be determined by the angle and elevation of each wireless device via an adaptive array antenna with distance measured via chip timing. Moreover, sector boundaries may be defined using boundary signal strength thresholds based on the known pilot channel power strength. For example, one known method for estimating a cell's radius based on signal strength measurements can be found in IEEE Transactions on Vehicular Technology of November '98, Bernardin, et al., which is incorporated by reference.

FIG. 6 illustrates a cell in which a sector is subdivided into sub-sectors 472a1, 472a2, and 472a3 in accordance with methods and systems consistent with the invention. In an embodiment of the invention, the sub-sectors 472a1 and 472a3 are 20 percent the size of sector 472 and sub-sector 472a2 is 60 percent the size of sector 472. In this embodiment, the size of the sub-sectors may vary depending on the then-current size of the sector in order to maintain the 20-60-20 percent ratios. Each side boundary of a sector may be adjusted independently, with two adjacent sectors having a common predetermined initial boundary that may serve as a reference line for sector adjustment.

Referring to the three sub-sectors 472a1, 472a2, and 472a3 of the sector 472a, linear regression may be used to estimate the sector radius separately for each of the three sub-sectors. For example, given a set of radius-power measurements from the wireless devices within each sub-sector ($r_i$, $P_i$), performing linear regression on the following propagation model may be used to determine the approximate radius of each sub-division.

$$P_i = A' - Bs_i;$$

where:
$P_i$ is the power received by wireless device i;
$r_i$ is the distance from wireless device i to the base station;
n is the number of wireless devices
$s_i = \log r_i$, i=1, 2, ..., n;

$$A' = \frac{\sum P_i - B \sum s_i}{n};$$

$$B = \frac{n \sum s_i P_i - \sum s_i \sum P_i}{n \sum s_i^2 - (\sum s_i)^2}; \text{ and}$$

the zero-mean process is $$\frac{P_i - \sum P_i}{n},$$

i=1, 2, ..., n.

Based on the determining A' and B, the radius may be derived as the distance where the power is equal to zero (or other threshold). Using this model, the fade margin is 1.282 times the standard deviation, corresponding to a cell radius estimate reliability of 90%. The fade margin is a safety margin that allows for foliage, etc. and the radius estimate reliability is a statistical reliability of the regression estimate of A' and B.

In addition, using the radius estimates obtained from this model, the overlapping area between two sectors may be calculated. For example, a method of calculating the overlapping area between adjacent cells is further described with reference to FIG. 7.

Figure 7:
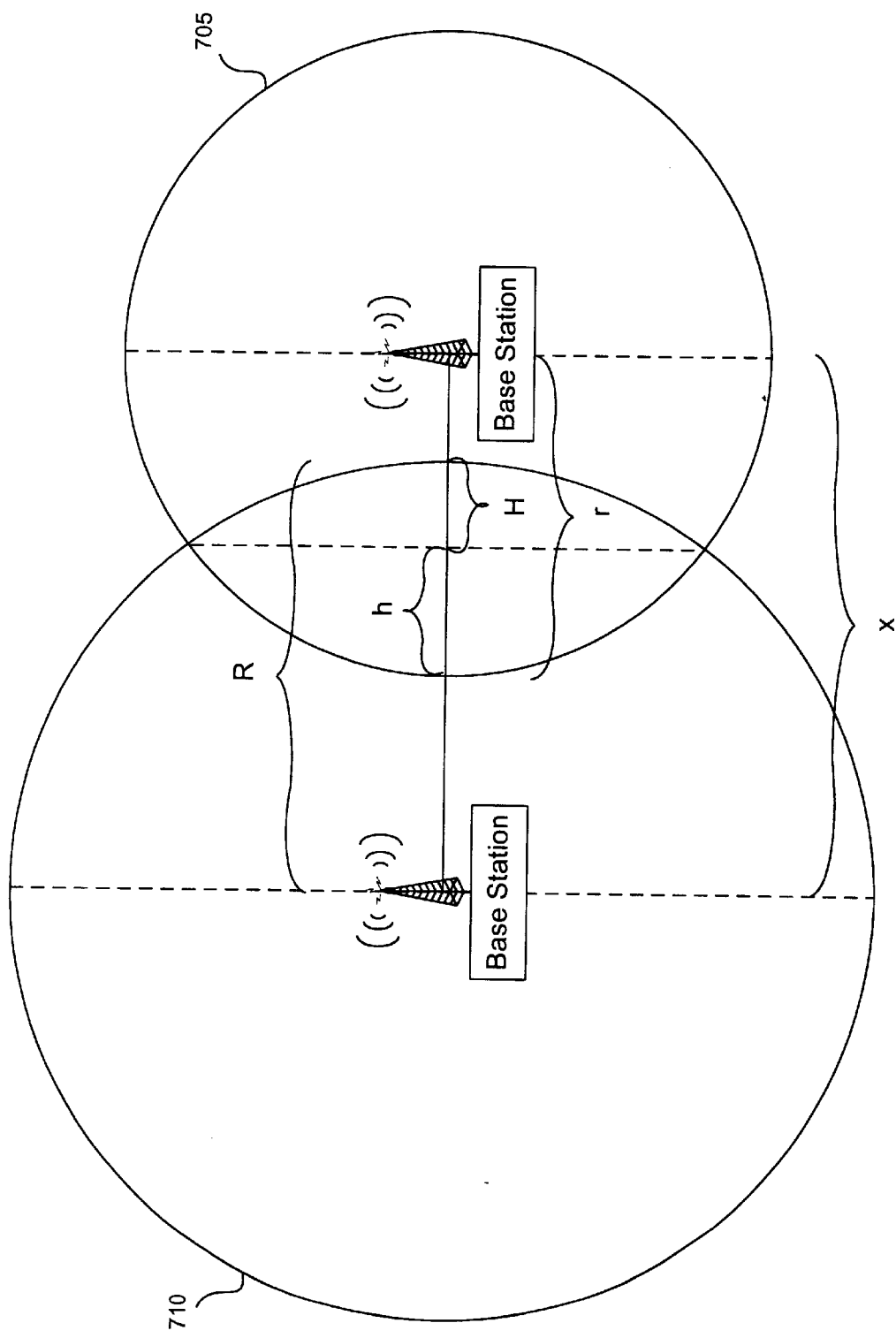
FIG. 7 illustrates two exemplary cells determining an overlapping area in accordance with methods and systems consistent with the present invention.

Referring now to FIG. 7, two exemplary cells are shown for determining an overlapping area in accordance with methods and systems consistent with the present invention. Because the locations of the base stations, and accordingly, the distances between base stations are known, the overlapping area may be determined by the following equation:

$$\text{Area} = r^2 \text{Cos}^{-1}\left(\frac{r-h}{r}\right) - (r-h)\sqrt{2rh - h^2}; \text{ where}$$

x is the distance between base stations;
r is the radius of cell 705;
R is the radius of cell 710;

$$H = \frac{r^2 - (x-R)^2}{2x}; \text{ and}$$

$$h = \frac{R^2 - (x-r)^2}{2x}$$

Using the predetermined desired overlap area as the target, the two base stations may mutually grow or mutually reduce their respective overlapping sectors. For example, by increasing the strength of a sector's power, the effective coverage area is increased thereby increasing the overlap area. In one embodiment, the overlap area is grown by increasing the strength of the sector's power and reduced by decreasing the strength of the sector's power.

In another embodiment of the present invention, the amount of adjustment needed to reach the desired overlap area between overlapping sectors may be apportioned according to the ratio of the areas of the sectors involved (area of a sector=the square of the radius times the sector angle divided by 2). The power adjustment for each sector may then be computed based on the sector's share of the area adjustment, again in proportion to the radius squared times the sector angle. Because the cell overlap area may be used to estimate the sector overlap area, the overlapping sector powers may be adjusted even though the comparison was based on the cell overlap area.

In accordance with an embodiment of the present invention, the necessary power adjustment is applied only to the 60 percent sub-sector 472a2.

For each 20 percent sub-sector 472a1 and 472a3, the radius estimates of each sub-sector 472a1 and 472a2 may be compared to the predetermined nominal values. In one embodiment of the invention, the sub-sectors 472a1 and 472a3 can have angular growth or reduction but cannot be reduced past the common boundary originally determined. In other words, the 20 percent sub-sectors may not be reduced so as to leave a gap in coverage between two adjacent sectors within the same cell. In accordance with an embodiment of the invention, the boundaries of sub-sectors 472a1 and 472a3 may be increased or reduced (if possible) by 1% of the then-current sector angle, to grow or reduce the sector radius toward its predetermined value. The sector angle may be increased or reduced using software controlling the antenna power configuration. Power may be proportionately adjusted to the change in area. Moreover, if there is a need to reduce the sector past the common boundary, an alarm may be posted to a base station operations channel.

Figure 8:
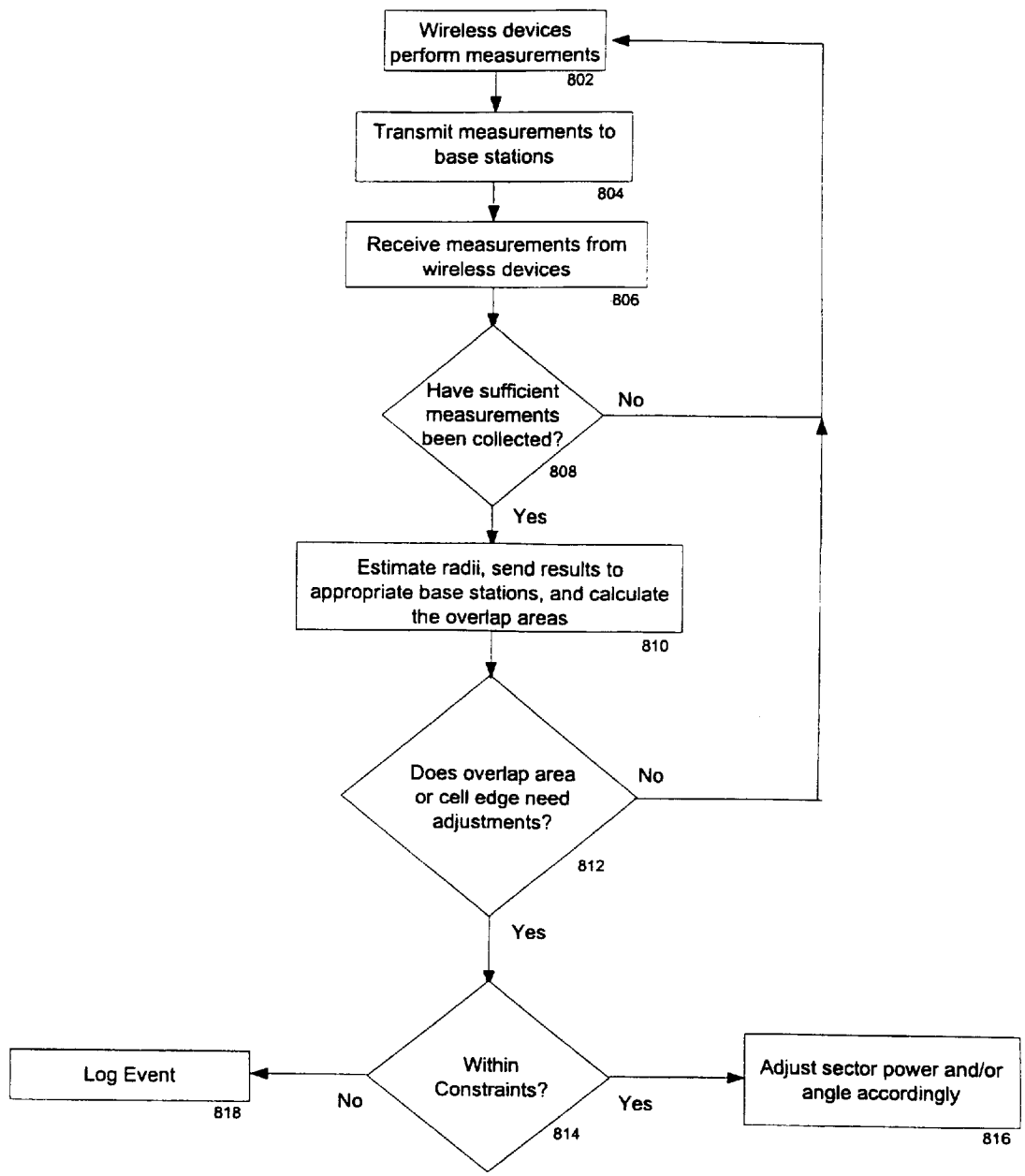
FIG. 8 illustrates a flow diagram of the steps performed for dynamically adjusting sectors across cells in accordance with methods and systems consistent with the present invention.

FIG. 8 illustrates a flow diagram of the steps performed for dynamically adjusting sectors across cells in accordance with methods and systems consistent with the present invention. While this method describes a simple example involving only two sectors, it should be obvious to one skilled in the art that the present invention can be easily extended to any number of sectors within any number of cells.

Referring now to FIGS. 4 and 8, wireless devices 420 and 460 may perform downlink channel measurements on their respective serving base station 410 or 450 (Step 802). After performing the measurements, the wireless devices may transmit the measurement information to its respective serving base station 410 or 450 (Step 804).

Upon receiving measurements from the wireless devices 460 and 420 (Step 806), each serving base station 410 and 450 determines whether sufficient measurements have been collected to estimate the boundary of each sector (Step 808). In order to offset inaccuracies that may appear with horizontal antenna arrays, an inverse filter may be used to remove anisotropic weighting prior to performing any estimates. In one embodiment of the present invention, approximately 2000 measurements may be required before a base station estimates its boundary.

If, at step 808, either base station 410 or 450 determines that insufficient measurements have been received, the base station(s) waits to receive additional measurements (Step 802). The present method may be continuously performed. Accordingly, once a threshold number of measurements are received, e.g., 2000, the present method may be repeated whenever a new measurement is received. Alternatively, boundary estimates may vary in time based on a base station's communication load. For example, base station 410 may determine that during busy periods, estimating boundaries and adjusting sectors is not practical due to the unavailability of processing power. Consequently, during such times sector adjustments may not be performed.

If on the other hand, at step 808, the base stations 410 and 450 determine that sufficient measurements have been received, the base stations estimate the boundaries of its respective sectors using, for example, the propagation model, P=A'−Bs as described above (Step 810). In an embodiment, the sector is divided into three sub-sectors. After performing estimation(s) for their respective sectors 432a and 472a, the base stations 410 and 450 transmit the estimate(s) to the appropriate neighboring base stations, in this case, each other (Step 810). Using the received estimate(s), each respective base station 410 or 450 then calculates the nominal cell edge region radii and overlap areas (Step 810). In one embodiment, the calculation may be done by only one of the base stations.

Based on the overlap areas and/or cell edge parameters, base stations 410 and 450 then determine whether sectors 432a and 472a should be grown or reduced (Step 812). If not, the base station waits to receive additional measurements (Step 802). If so, the base station determines whether the adjustments can be accomplished within the predetermined constraints (Step 814).

If, at step 814, the sectors can be adjusted within the constraints, then base stations 410 and 450 each adjust their respective sectors (816) and the method for dynamically adjusting the sectors is complete. Step 802 then waits for additional measurements to start a next method for dynamic adjustment of sectors. On the other hand, if sectors 432a and 472a cannot be adjusted within the constraints, then the event is logged for later review (Step 818).

While it has been illustrated and described what is at present considered to be the preferred embodiments and methods of the present invention, it will be understood by those skilled in the art that various changes and modifications may be made, and equivalents may be substituted for elements thereof without departing from the true scope of the invention. Moreover, it should be appreciated that the present invention may be used for many different applications, such as automatic configuration when a new base station is added to a wireless communication system. Therefore it is intended that the invention not be limited to the particular embodiments and methods disclosed herein, but the invention includes all embodiments falling within the scope of the appended claims.

What is claimed is:

1. A method for adjusting coverage in a wireless communication system, comprising the steps of:

providing a plurality of cells, including a first serving cell and a second serving cell;

providing a first plurality of wireless devices and a second plurality of wireless devices, wherein the first plurality of wireless devices monitor a signal strength of the first serving cell and the second plurality of wireless devices monitor a signal strength of the second serving cell;

collecting signal strength information from the first plurality of wireless devices at the first serving cell;

collecting signal strength information from the second plurality of wireless devices at the second serving cell;

determining coverage area of the first and second serving cells based on the respective collected signal strength information;

exchanging coverage area information between the first serving cell and the second serving cell; and adjusting the coverage area of the first or the second serving cell based on the determined coverage area information of the first and second serving cells.

2. The method of claim 1, wherein the coverage area information exchanged between the first cell and the second cell is communicated through a packet network.

3. The method of claim 1, wherein the steps of claim 1 are repeated periodically.

4. A method for mapping one or more coverage areas in a wireless communication system, comprising the steps of:
providing a first cell that serves a plurality of wireless devices;
monitoring a power of the first cell;
collecting, at the first cell, information about the plurality of wireless devices; and
mapping a first coverage area based on the collected information, said mapping step comprising the step of determining a radius of the first coverage area by performing a linear regression based on the collected information by applying a model:

$$P = A' - Bs_i;$$

where:
P is the power received by the at least one wireless device;
r is a radius;
$s_i = \log r_i$, i=1, 2, ..., n;

$$A' = \frac{\sum P_i - B \sum s_i}{n}; \text{ and}$$

$$B = \frac{n \sum s_i P_i - \sum s_i \sum P_i}{n \sum s_i^2 - (\sum s_i)^2}.$$

5. The method of claim 4, wherein the step of collecting information is responsive to a measurement request from the first cell.

6. The method of claim 4, wherein the steps of claim 4 are repeated periodically.

7. A method for mapping one or more coverage areas in a wireless communication system, comprising the steps of:
providing a first cell that serves a plurality of wireless devices;
monitoring a power of the first cell;
collecting, at the first cell, information about the plurality of wireless devices;
mapping a first coverage area based on the collected information;
transmitting, from the first cell, mapping information about the first coverage area to a second cell having a second coverage area;
receiving, at the second cell, the mapping information;
determining whether the second coverage area should be adjusted based on the mapping information; and
adjusting the second coverage area based on the mapping information.

8. The method of claim 7, wherein the mapping information is communicated between the first cell and the second cell through a packet network.

9. A method for adjusting coverage in a wireless communication system, comprising the steps of:
receiving measurement information from at least one wireless device at a first cell having a first coverage area;
determining the first coverage area based on the received measurement information;
transmitting, from the first cell, information about the first coverage area to a second cell having a second coverage area;
receiving, at the second cell, the first coverage area information; and
adjusting the second coverage area based on the first coverage area information.

10. The method of claim 9, further comprising the step of transmitting a pilot channel signal to the at least one wireless device, wherein the measurement information includes a strength measurement of the pilot channel signal received by the at least one wireless device.

11. The method of claim 10, wherein the step of adjusting the coverage area of the second cell comprises the steps of:
changing a power of a pilot channel signal transmitted by the second cell; and
changing an antenna angle for the signal transmitted by the second cell.

12. The method of claim 10, wherein the measurement information further includes a location of the least one wireless device.

13. The method of claim 9, further comprising the step of determining whether the second coverage area should be adjusted based on the first coverage area information.

14. The method of claim 13, wherein the first and second coverage areas are both adjusted.

15. The method of claim 9, wherein the coverage area information exchanged between the first cell and the second cell is communicated through a packet network.

16. The method of claim 9, wherein the step of receiving measurement information is responsive to a measurement request from the first cell.

17. The method of claim 9, wherein the steps of claim 1 are repeated periodically.

* * * * *